Patented Aug. 5, 1952

2,606,152

UNITED STATES PATENT OFFICE 2,606,152

MINERAL OIL COMPOSITIONS

Herschel G. Smith, Wallingford, and Troy L. Cantrell, Lansdowne, Pa., and John G. Peters, Audubon, N. J., assignors to Gulf Oil Corporation, Pittsburgh, Pa., a corporation of Pennsylvania No Drawing. Application November 8, 1949, Serial No. 126,242

11 Claims. (Cl. 252—32.5)

This invention relates to improved mineral oil compositions, and more particularly, to improved mineral oils and mineral oil compositions containing minor amounts of improved agents which inhibit corrosion and prevent rust formation normally arising in the use of mineral oil lubricants.

Since simple mineral oils afford only a limited protection to metal surfaces from rust and other types of corrosion, many so-called anti-corrosive lubricating oils have been proposed consisting of mineral oils and various added constituents. These have not been entirely satisfactory.

We have discovered certain new improvement agents for mineral oils which are particularly advantageous in the commercial preparation of various lubricants, protective coating compositions and other useful mineral oil compositions. Our new agents can be readily incorporated in various mineral oils and oil compositions. When incorporated therein, even in very small amounts, these agents markedly improve the rust protective properties thereof. Moreover, they are also capable of imparting other useful and advantageous properties to the mineral oils and oil compositions in which they are incorporated.

An object of this invention is to provide an improved oil composition which is useful and advantageous in protecting both ferrous and non-ferrous metals from rust, corrosion and wear.

It is another object of this invention to provide improved mineral oil compositions containing agents capable of conferring marked anti-corrosive properties on the compositions.

These and other objects are achieved by the provision of an improved mineral oil composition comprising a major amount of a mineral oil and a minor amount, sufficient to confer corrosion inhibiting properties on the mineral oil, of a phthalamidate-substituted ortho phosphoric acid having the formula:

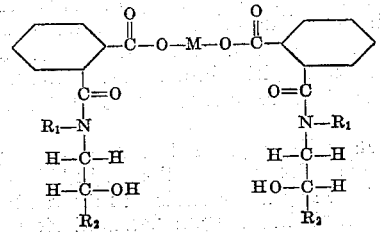

or the salts thereof, wherein M is a divalent metal, R₁ is selected from the group consisting of alkyl and alkenyl radicals containing from 8 to 22 carbon atoms, and R₁ is a member of the class consisting of hydrogen and alkyl radicals. The above acids and salts are described and claimed in our copending application, Serial No. 126,241, filed of even date herewith.

The improvement agents of this invention, the so-called phthalamidate-substituted ortho phosphoric acids, can be prepared as follows. There is first prepared a divalent metal salt of an N-alkyl or alkenyl, N-alkylol phthalamidic acid, i. e., a compound of the formula:

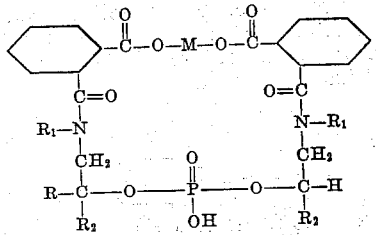

wherein M is a divalent metal, R₁ is selected from the group consisting of alkyl and alkenyl radicals containing from 8 to 22 carbon atoms, and R₂ is a member of the class consisting of hydrogen and alkyl radicals. The method of preparation of such compounds is described in our U. S. Patent 2,408,103. The above phthalamidic acid salts are then reacted with an esterifying derivative of ortho phosphoric acid to form the phthalamidate-substituted ortho phosphoric acid. If a salt of the resulting acid is desired, the acid is neutralized with an organic or inorganic base.

It will be noted that the N-alkylol grouping in the above-described phthalamidate salt results in the presence of two hydroxyl groups in the molecule. Accordingly, in preparing the phthalamidate-substituted ortho phosphoric acids of this invention, the two hydroxyl groups in the phthalamidate salt are esterified by a suitable esterifying derivative of ortho phosphoric acid, for example, phosphorus pentoxide, phorphorus oxychloride or the like. Of course, when phosphorus oxychloride is used, the residual chlorine is hydrolyzed off, in a manner known to the art, to obtain our phthalamidate-substituted ortho phosphoric acid. The amount of the ortho phosphoric acid derivative employed is such as to esterify both free hydroxyl groups in the above phthalamidate salt. Thus, for each mol of the phthalamidate salt employed, there is employed one-half mol of phosphorus pentoxide or one mol of phosphorus oxychloride.

The salts of the phthalamidate-substituted ortho phosphoric acids of our invention are simply prepared by neutralization with a suitable base. Either inorganic bases or organic nitrogen bases are employed. Inorganic salts can also be prepared by metathesis of an alkali metal salt of the phthalamidate-substituted ortho phosphoric acid and a water-soluble inorganic salt of another metal.

These phthalamidate-substituted ortho phosphoric acids and their salts are excellent improvement agents for mineral oils of various kinds and they can be easily incorporated in such oils to form valuable compositions. All of these improvement agents are readily soluble in mineral oils, particularly naphthenic type oils.

We find it convenient to prepare solutions of our new additives in a mineral oil by forming them in situ in the oil. In such processes the phthalamidate salt is first dissolved in a mineral oil, such as a mineral lubricating oil, naphtha, Stoddard solvent, etc. and then the phosphorus pentoxide is added, the mixture being stirred and maintained at the desired temperature until the reaction is complete. The mineral oil solution of the resulting phthalamidate-substituted ortho phosphoric acid may then be neutralized with a base.

As a class the new acids and salts of our invention are light brown solids of indefinite melting point. They are soluble in mineral lubricating oils, naphtha, carbon tetrachloride, carbon disulfide and benzene, but are insoluble in alcohol, water, acetone and glycol.

The following examples are illustrative of the preparation of a few of our improvement agents. However, our invention is not to be limited to these particular examples. Unless otherwise indicated, all parts are by weight.

EXAMPLE I

Into an iron reaction vessel, there were charged 892 parts of the calcium salt of N-cetyl, N-propanol phthalamidic acid which was then heated to a temperature of 170° F. Thereafter 35 parts of phosphorus pentoxide dispersed in 20 parts of a mineral lubricating oil having a viscosity of 150 S. U. S. at 100° F. were added to the phthalamidate in the reaction vessel over a period of 2 hours. The temperature was then raised to 220° F. to complete the reaction. The product obtained was a light brown solid of indefinite melting point, insoluble in water and alcohol, but soluble in benzene, naphtha, and mineral lubricating oils. It had the formula:

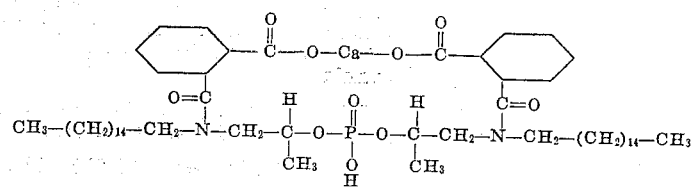

EXAMPLE II

Into an iron reaction vessel there was charged 892 parts of the calcium salt of N-cetyl, N-propanol phthalamidic acid which was then heated to 170° F. Then 153 parts of phosphorus oxychloride were added and the temperature raised to 220° F. to complete the reaction. Thereafter 148 parts of hydrated lime in a 50 percent water slurry were added to remove the hydrochloric acid by-product and to hydrolyze the remaining chlorine atom in the reaction product, thus making the calcium salt of the reaction product. The product was then diluted with 950 parts of benzene, the water layer was drawn off and the benzene layer was filtered. The filtered benzene solution was then transferred to an iron stirring still and the benzene removed under a vacuum of 20 inches of mercury. The salt obtained as a residue was a neutral light brown solid of indefinite melting point. It had the following formula:

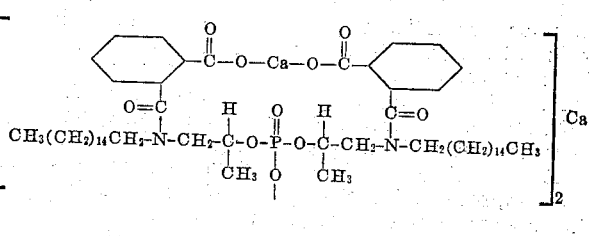

EXAMPLE III

Into an iron reaction vessel were placed 832 parts of the calcium salt of N-dodecyl, N-propanol phthalamidic acid, 60 parts of 150 viscosity SUS/100° F. mineral lubricating oil, and 22 parts of phosphorus pentoxide. The reactants were heated to a temperature of 230° F. until the reaction was complete. The reaction product was then neutralized with 6 parts of calcium hydroxide at 240° F. and filtered. The compound so prepared had the formula:

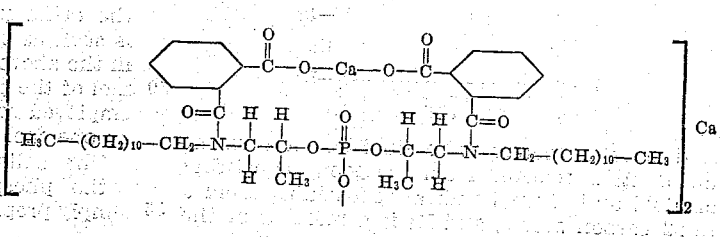

and its solution in the mineral oil had the following properties:

| | |
|---|---|
| Gravity, °API | 18.0 |
| Viscosity, SUV: | |
| 100° F. | 283.3 |
| 210 | 51.0 |
| Color, NPA | 3.75 |
| Neutralization No. | 4.04 |
| Ash, percent | 2.91 |
| pH value | 7.7 |

EXAMPLE IV

Into an iron reaction vessel were placed 832 parts of the calcium salt of N-dodecyl, N-propanol phthalamidic acid, 22 parts of phosphorus pentoxide, and 50 parts of 150 Viscosity SUS/100° F. mineral lubricating oil. The reactants were heated to a temperature of 230° F. until the reaction was complete. The product was then neutralized with 61 parts of cocoamine. The compound thus prepared had the formula:

$$\text{[structural formula showing two phenyl-C(=O)-O-Ca-O-C(=O) groups connected via }$$
$$H_3C-(CH_2)_{10}-CH_2-N-C-C-O-P-O-C-C-N-CH_2-(CH_2)_{10}-CH_3$$
$$\text{with } CH_3, H, O, NH_2R \text{ substituents}]$$

wherein R is the "co co" radical; and its solution in the mineral oil had the following properties:

| | |
|---|---|
| Gravity, °API | 20.3 |
| Viscosity, SUV: | |
| 100° F | 307 |
| 210 | 52.4 |
| Color, NPA | 3.25 |
| Neutralization No | 10.52 |
| Ash as oxide, per cent | 1.8 |
| pH value | 7.7 |

The N-alkyl or alkenyl, N-alkylol phthalamidic acid divalent metal salts from which our phthalamidate-substituted ortho phosphoric acid is made can be obtained from any suitable source. As indicated hereinabove, one convenient method of preparing these divalent metal salts is described in our U. S. Patent 2,408,103. By this method secondary alkyl, alkylol amines are first prepared by reacting alkylene oxides, such as ethylene oxide, propylene oxide, butylene oxide, etc., with primary alkyl or alkenyl amines. Suitable primary alkyl or alkenyl amines are those having from 8 to 22 carbon atoms, such as octyl, decyl, decenyl, undecenyl, dodecyl (lauryl), dodecenyl, tetradecyl, hexadecyl (cetyl), octadecyl (stearyl), 9,10-octadecenyl (oleyl), eicosyl, eicosenyl, docosyl, etc. The resulting alkylol amines are then reacted with phthalic anhydride in substantially equimolecular amounts to form a mono-amide of phthalic acid, namely the desired N-alkyl or alkenyl, N-alkylol phthalamidic acid, which is then converted to the divalent metal salt. Any divalent metal can be used in the preparation of the salt including calcium, magnesium, barium, lead, cadmium, copper, tin, strontium, iron, zinc, cobalt, etc.

As has been indicated hereinabove, various salts of the phthalamidate-substituted ortho phosphoric acids of our invention are simply prepared by neutralization or metathesis. For example, alkali metal and ammonium salts can be prepared by neutralizing the acid with a hydroxide or carbonate of an alkali metal such as sodium, potassium, lithium, ammonium, etc. Other suitable hydroxides yielding valuable salts are calcium, barium, magnesium, strontium and aluminum hydroxides. Salts of these metals as well as salts of zinc, copper, tin, lead, iron, cobalt, nickel, manganese, cadmium, mercury, bismuth, vanadium, chromium, etc., can conveniently be prepared by metathesis of a water-soluble inorganic salt of such metal with an alkali metal salt of our phthalamidate-substituted ortho phosphoric acid.

Organic nitrogen bases also yield valuable addition salts. Such bases include primary, secondary and tertiary aliphatic and aromatic amines, alkylol amines and heterocyclic nitrogen bases. Primary alkyl amines such as ethyl, butyl, amyl, hexyl, cyclohexyl, heptyl, octyl, decyl, undecyl, lauryl, tetradecyl, hexadecyl, octadecyl and eicosyl are suitable. Mixtures of primary alkyl amines, such as are present in commercially available amines derived from fatty acids by well known methods, make desirable salts. For example, cocoamine, derived from coconut oil fatty acids and containing primarily dodecyl amine with smaller amounts of homologues, yields a preferred salt. Primary alkenyl amines corresponding to the primary alkyl amines, such as undecenyl, oleyl, etc., can also be employed. A preferred group is the primary alkyl or alkenyl amines having from 8 to 22 carbon atoms. Salts derived from secondary and tertiary amines whether aliphatic or aromatic, such as the di- and tri-ethanolamines, dicyclohexyl amine, aniline, N-alkyl and N-dialkylarylamines, e. g., N-ethylaniline, N-dimethylaniline, are satisfactory. A valuable class of salts is derived from heterocyclic nitrogen bases such as pyridine, picoline, ethyl pyridine, lutidine, aldehydine, parvoline, quinoline, quinaldine, lepidine, isoquinoline, nicotine, piperidine, morpholine, N-phenyl morpholine, etc.

A wide range of improved antirust or anticorrosive compositions can be readily prepared by incorporating minor amounts of our improvement agents in suitable oils and oil compositions. Moreover, such improved compositions effectively protect ferrous and non-ferrous metals against rusting and corrosion, even when exposed to salt water and other severe conditions. When applied to such metals they tightly adhere to the metal, forming a resistant film which protects the metals even when they are exposed to drastic conditions. Generally, our new compounds are employed in amounts sufficient to give the desired corrosion inhibiting effect, say from 0.01 to 10 per cent by weight of the composition in which they are incorporated.

The outstanding improvements obtained by the present invention are illustrated in the following examples, which are typical of our improved oils.

EXAMPLE V

An improved mineral lubricating oil was prepared by the addition of 0.3 per cent of an additive prepared according to Example III to a mineral lubricating oil base. The properties of the unimproved oil and the improved oil prepared therefrom were as follows:

*Properties*

|  | Uninhibited Oil | Inhibited Oil |
|---|---|---|
| Gravity, °API | 32.0 | 31.8 |
| Viscosity, SUV: |  |  |
| 100° F | 152.0 | 150.9 |
| 210 | 43.4 | 43.3 |
| Viscosity Index | 105 | 100 |
| Pour, °F | +15 | +15 |
| Color, NPA | 1.25 | 1.25 |
| Copper strip Test, 212° F., 3 Hrs | passes | passes |
| Neutralization No | 0.01 | 0.02 |

CORROSION TESTS

| Corrosion Test, ASTM D 665–47 T: |  |  |
|---|---|---|
| Distilled Water— |  |  |
| Appearance of Steel Rod | rusted | bright |
| Area Rusted, Percent | 100 | 0 |
| Synthetic Sea Water— |  |  |
| Appearance of Steel Rod | rusted | bright |
| Area Rusted, Percent | 100 | 0 |
| Static Rust Test (Ord. Spec. 814, F–2a) | fails | passes |

EXAMPLE VI

An improved mineral lubricating oil was prepared by the addition of 0.3 per cent of an additive prepared according to Example IV to a mineral lubricating oil base. The properties of the unimproved oil and the improved oil prepared therefrom were as follows:

*Properties*

|  | Uninhibited Oil | Inhibited Oil |
|---|---|---|
| Gravity, °API | 31.8 | 31.8 |
| Viscosity, SUV: |  |  |
| 100° F | 151.7 | 151.0 |
| 210 | 43.5 | 43.3 |
| Viscosity Index | 100 | 100 |
| Pour, °F | +15 | +15 |
| Color, NPA | 1.25 | 1.25 |
| Copper Strip Test, 212° F., 3 Hrs | passes | passes |
| Neutralization No | 0.01 | 0.03 |

CORROSION TESTS

| Corrosion Test, ASTM D 665–47 T: |  |  |
|---|---|---|
| Distilled Water— |  |  |
| Steel Rod, Appearance | rust | bright |
| Area Rusted, Percent | 100 | 0 |
| Synthetic Sea Water— |  |  |
| Steel Rod, Appearance | rust | bright |
| Area Rusted, Percent | 100 | 0 |
| Static Rust Test (Ord. Spec. 814, F–2a) | fails | passes |

EXAMPLE VII

An improved mineral lubricating oil was prepared by the addition of 0.3 per cent of an additive prepared according to Example I to a mineral lubricating oil base. The properties of the unimproved oil and the improved oil prepared therefrom were as follows:

*Properties*

|  | Uninhibited Oil | Inhibited Oil |
|---|---|---|
| Gravity, °API | 31.8 | 31.7 |
| Viscosity, SUV: |  |  |
| 100° F | 151.7 | 153.2 |
| 210 | 43.5 | 43.7 |
| Viscosity Index | 100 | 100 |
| Pour, °F | +15 | +15 |
| Color, NPA | 1.25 | 1.25 |
| Copper Strip Test, 212° F., 3 Hrs | passes | passes |
| Neutralization No | 0.01 | 0.19 |

CORROSION TESTS

| Corrosion Test, ASTM D 665–47 T: |  |  |
|---|---|---|
| Distilled Water— |  |  |
| Steel Rod, Appearance | rusted | bright |
| Area Rusted, Percent | 100 | 0 |
| Synthetic Sea Water— |  |  |
| Steel Rod, Appearance | rusted | bright |
| Area Rusted, Percent | 100 | 0 |
| Static Rust Test (Ord. Spec. 814, F–2a) | fails | passes |

As shown by the tabulation of properties in Examples V, VI and VII above, the incorporation of our improvement agents in mineral lubricating oils, in the amounts necessary to impart marked rust preventive qualities thereto, did not substantially change any of the other properties of the oils. However, the corrosion tests set forth above, clearly show the markedly improved rust preventive qualities of the improved oils. When subjected to the various standard tests used in evaluating commercial oils, they successfully passed all of them, even the most drastic. As shown by the results obtained in the corrosion tests, rusting of steel is entirely prevented with the improved oils. For these reasons, such improved oils are advantageously used as turbine oils, particularly since the oils are resistant to emulsification.

Our improved oils have other superior properties. For example, they have excellent lubricating qualities when evaluated by the standard "Falex wear test." When so evaluated the test data obtained are as follows, the oil used in the following being a highly refined mineral lubricating oil having a viscosity of 300 SUS at 100° F.

|  | Uninhibited Oil | Oil Treated with 10% of salt of Example III | Oil Treated with 10% of salt of Example IV |
|---|---|---|---|
| Inspection: |  |  |  |
| Falex Wear Test, Dry Method— |  |  |  |
| 500 Lb. Gauge Load for 15 Min. |  |  |  |
| Wear, No. of Teeth |  | 3 | 4 |
| Gauge Load at Seizure, Lb |  | 1,350 | 1,350 |
| Falex Wear Test, Wet Method [1]— |  |  |  |
| 500 Lb. Gauge Load for 15 Min. |  |  |  |
| Wear, No. of Teeth |  | 0 | 6 |
| Gauge Load at Seizure, Lb |  | 1,550 | 1,300 |

[1] In this test, 10 per cent of water is present in the oil during the test.

The above examples are typical embodiments of the present invention and various other embodiments will occur to those skilled in the art. The examples given show that a plurality of advantageous properties can be imparted to mineral oils by incorporating our new improvement agents therein.

Our new agents are useful and advantageous in preparing improved motor oils for lubricating automotive, aviation and diesel engines. Such improved oils can be readily prepared by incorporating a small percentage of the improvement agent in a suitable mineral lubricating oil, usually from 0.01 to 10 per cent by weight of the oil. In addition to mineral lubricating oils our improvement agents are readily soluble in various hydrocarbon oils; and they are also readily miscible with waxes, petrolatum, and greases. Thus, various slushing and coating compositions having improved anti-corrosive properties can be prepared in accordance with our invention. Our new compounds may be incorporated in various mineral oils, such as gasoline, kerosene, diesel fuel and other fuels; Stoddard solvent, V. M. & P. naphtha and like volatile hydrocarbon solvents for the preparation of simple anti-corrosive coating compositions; and, of course, all types of mineral lubricating oils, such as turbine oils, motor oils, aviation oils, diesel oils, etc.

In the preparation of mineral lubricating oils in accordance with our invention other known addition agents such as viscosity index improvers, pour point depressants, anti-foam agents and the like may be added without departing from the spirit of our invention.

While our invention has been described above with reference to various representative examples and embodiments, it will be understood that the invention is not limited to such illustrative examples and embodiments, but may be variously practiced within the scope of the claims herein made.

We claim:

1. An improved mineral oil composition comprising a major amount of a mineral oil and a minor amount, sufficient to confer corrosion inhibiting properties, of an oil soluble compound selected from the group consisting of an acid having the formula:

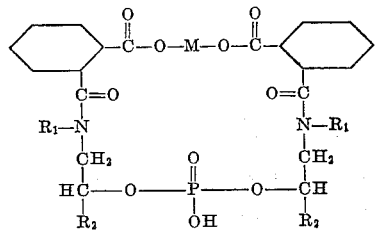

and salts thereof, wherein M is a divalent metal, $R_1$ is selected from the group consisting of alkyl and alkenyl radicals having from 8 to 22 carbon atoms and $R_2$ is a member of the class consisting of hydrogen and alkyl radicals.

2. The composition of claim 1, wherein the mineral oil is an oil of lubricating viscosity.

3. An improved mineral oil composition comprising a major amount of a mineral oil, and a minor amount, sufficient to confer corrosion inhibiting properties, of an oil soluble metal salt of a compound having the formula:

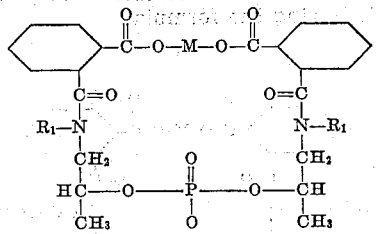

wherein M is a divalent metal and $R_1$ is selected from the group consisting of alkyl and alkenyl radicals having from 8 to 22 carbon atoms.

4. The composition of claim 3, wherein the mineral oil is an oil of lubricating viscosity, the metal of the metal salt is a divalent metal, and M is an alkaline earth metal.

5. An improved mineral oil composition comprising a major amount of a mineral oil and a minor amount, sufficient to confer corrosion inhibiting properties, of a salt of an organic nitrogen base and an acid having the formula:

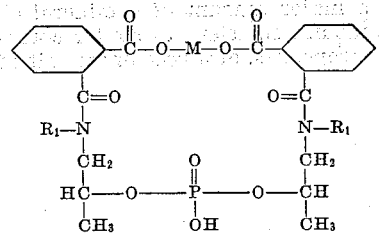

wherein M is a divalent metal and $R_1$ is selected from the group consisting of alkyl and alkenyl radicals having from 8 to 22 carbon atoms.

6. The composition of claim 5, wherein the mineral oil is an oil of lubricating viscosity, M is an alkaline earth metal, and the organic nitrogen base is a primary aliphatic amine having from 8 to 22 carbon atoms.

7. An improved mineral oil composition comprising a major amount of a mineral oil, and a minor amount, sufficient to confer corrosion inhibiting properties, of a substituted ortho phosphoric acid having the formula:

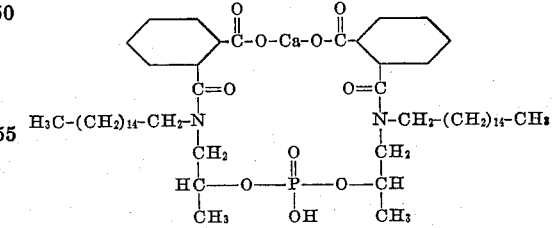

8. A lubricant composition comprising a major amount of a mineral lubricating oil and a minor amount, from 0.01 to 10 per cent by weight, of an alkaline earth metal salt of a substituted ortho phosphoric acid, said salt having the formula:

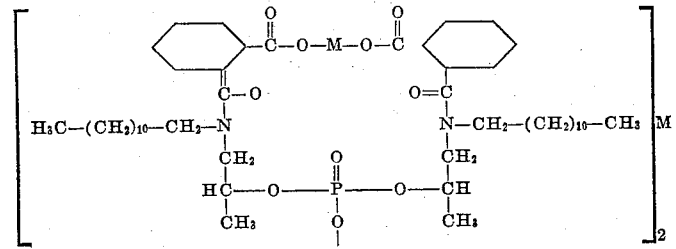

wherein M is an alkaline earth metal.

9. A lubricant composition in accordance with claim 8 wherein M is calcium.

10. A lubricant composition comprising a major amount of a mineral lubricating oil and a minor amount, from 0.01 to 10 per cent by weight, of an amine salt of a substituted ortho phosphoric acid, said salt having the formula:

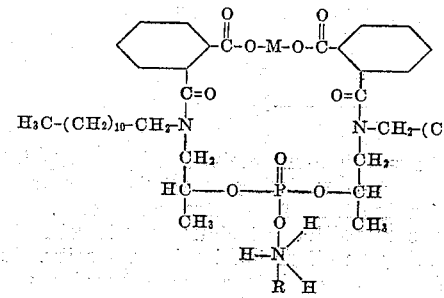

wherein R is an aliphatic radical having from 8 to 22 carbon atoms, and M is a divalent metal.

11. An improved mineral oil composition comprising a major amount of a mineral oil and a minor amount, sufficient to confer corrosion inhibiting properties, of a cocoamine salt of a substituted ortho phosphoric acid, said salt having the formula:

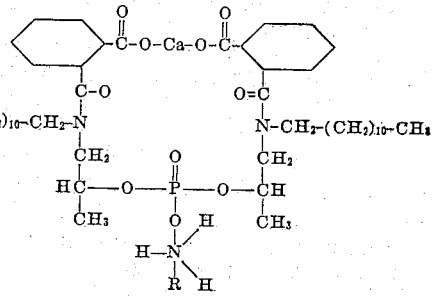

wherein R is the "coco" radical.

HERSCHEL G. SMITH.
TROY L. CANTRELL.
JOHN G. PETERS.

REFERENCES CITED

The following references are of record in the file of this patent:

UNITED STATES PATENTS

| Number | Name | Date |
|---|---|---|
| 2,378,442 | Smith et al. | June 19, 1945 |
| 2,378,443 | Smith et al. | June 19, 1945 |
| 2,400,611 | Smith et al. | May 21, 1946 |
| 2,403,764 | Smith et al. | July 9, 1946 |
| 2,408,103 | Smith et al. | Sept. 24, 1946 |